United States Patent
Yang et al.

(10) Patent No.: US 11,165,604 B2
(45) Date of Patent: Nov. 2, 2021

(54) METHOD AND SYSTEM USED BY TERMINAL TO CONNECT TO VIRTUAL PRIVATE NETWORK, AND RELATED DEVICE

(71) Applicant: Huawei Technologies Co., Ltd., Shenzhen (CN)

(72) Inventors: Yancheng Yang, Beijing (CN); Xiangrong Chen, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 449 days.

(21) Appl. No.: 16/164,249

(22) Filed: Oct. 18, 2018

(65) Prior Publication Data

US 2019/0052482 A1 Feb. 14, 2019

Related U.S. Application Data

(63) Continuation of application No. PCT/CN2017/080310, filed on Apr. 12, 2017.

(30) Foreign Application Priority Data

Apr. 18, 2016 (CN) .......................... 201610242556.0

(51) Int. Cl.
*H04L 12/46* (2006.01)
*H04L 29/06* (2006.01)
(Continued)

(52) U.S. Cl.
CPC .......... *H04L 12/4641* (2013.01); *H04L 12/66* (2013.01); *H04L 61/2007* (2013.01);
(Continued)

(58) Field of Classification Search
CPC . H04L 12/4641; H04L 12/66; H04L 61/2007; H04L 63/0272; H04L 63/0428; H04L 63/0876; H04L 63/166
See application file for complete search history.

(56) References Cited

U.S. PATENT DOCUMENTS 7,181,360 B1 2/2007 Nikolac et al.
8,549,300 B1 10/2013 Kumar et al.
(Continued)

FOREIGN PATENT DOCUMENTS

CN 101217575 A 7/2008
CN 101442565 A 5/2009
(Continued)

OTHER PUBLICATIONS

Foreign Communication From a Counterpad Application, European Application No. 17785379.3, Extended European Search Report dated Dec. 19, 2018, 8 pages.
(Continued)

*Primary Examiner* — Trang T Doan
(74) *Attorney, Agent, or Firm* — Conley Rose, P.C.

(57) ABSTRACT

A method and a system used by a terminal to connect to a virtual private network (VPN), and a related device to resolve a problem that workload is heavy and an error is easy to occur currently during configuration of an Internet Protocol (IP) address of a VPN gateway for a terminal. A VPN control device is responsible for authenticating access of the terminal, and determining a VPN gateway to which the terminal is allowed to connect. When an IP address of the VPN control device is configured for all terminals in a system, terminal security authentication can be implemented.

17 Claims, 16 Drawing Sheets

(51) Int. Cl.
*H04L 12/66* (2006.01)
*H04L 29/12* (2006.01)

(52) U.S. Cl.
CPC ...... *H04L 63/0272* (2013.01); *H04L 63/0428* (2013.01); *H04L 63/0876* (2013.01); *H04L 63/166* (2013.01)

(56) References Cited

U.S. PATENT DOCUMENTS

| | | | | |
|---|---|---|---|---|
| 9,485,220 | B2* | 11/2016 | Basha | H04L 63/0884 |
| 2002/0069278 | A1* | 6/2002 | Forslow | H04L 63/0272 |
| | | | | 709/225 |
| 2008/0037557 | A1* | 2/2008 | Fujita | H04L 12/4641 |
| | | | | 370/395.53 |
| 2015/0043350 | A1 | 2/2015 | Basilier | |
| 2015/0052345 | A1* | 2/2015 | Martini | H04L 63/0471 |
| | | | | 713/150 |
| 2016/0087941 | A1* | 3/2016 | Mudigonda | H04L 61/303 |
| | | | | 726/12 |

FOREIGN PATENT DOCUMENTS

| | | |
|---|---|---|
| CN | 101715179 A | 5/2010 |
| CN | 101902400 A | 12/2010 |
| CN | 102065125 A | 5/2011 |
| CN | 102223365 A | 10/2011 |
| CN | 105187380 A | 12/2015 |

OTHER PUBLICATIONS

Machine Translation and Abstract of Chinese Publication No. CN101217575, Jul. 9, 2008, 12 pages.
Machine Translation and Abstract of Chinese Publication No. CN101715179, May 26, 2010, 12 pages.
Machine Translation and Abstract of Chinese Publication No. CN101902400, Dec. 1, 2010, 20 pages.
Machine Translation and Abstract of Chinese Publication No. CN102223365, Oct. 19, 2011, 18 pages.
Dierks, T., et al., "The Transport Layer Security (TLS) Protocol," Version 1.2. RFC 5246, Aug. 2008, 104 pages.
Foreign Communication From a Counterpart Application, PCT Application No. PCT/CN2017/080310, English Translation of International Search Report dated Jun. 30, 2017, 2 pages.
Foreign Communication From a Counterpart Application, PCT Application No. PCT/CN2017/080310, English Translation of Written Opinion dated Jun. 30, 2017, 4 pages.
Machine Translation and Abstract of Chinese Publication No. CN101442565, May 27, 2009, 21 pages.
Machine Translation and Abstract of Chinese Publication No. CN102065125, May 18, 2011, 30 pages.
Machine Translation and Abstract of Chinese Publication No. CN105187380, Dec. 23, 2015, 13 pages.
Foreign Communication From a Counterpart Application, Chinese Application No. 201610242556.0, Chinese Office Action dated May 8, 2019, 7 pages.

* cited by examiner

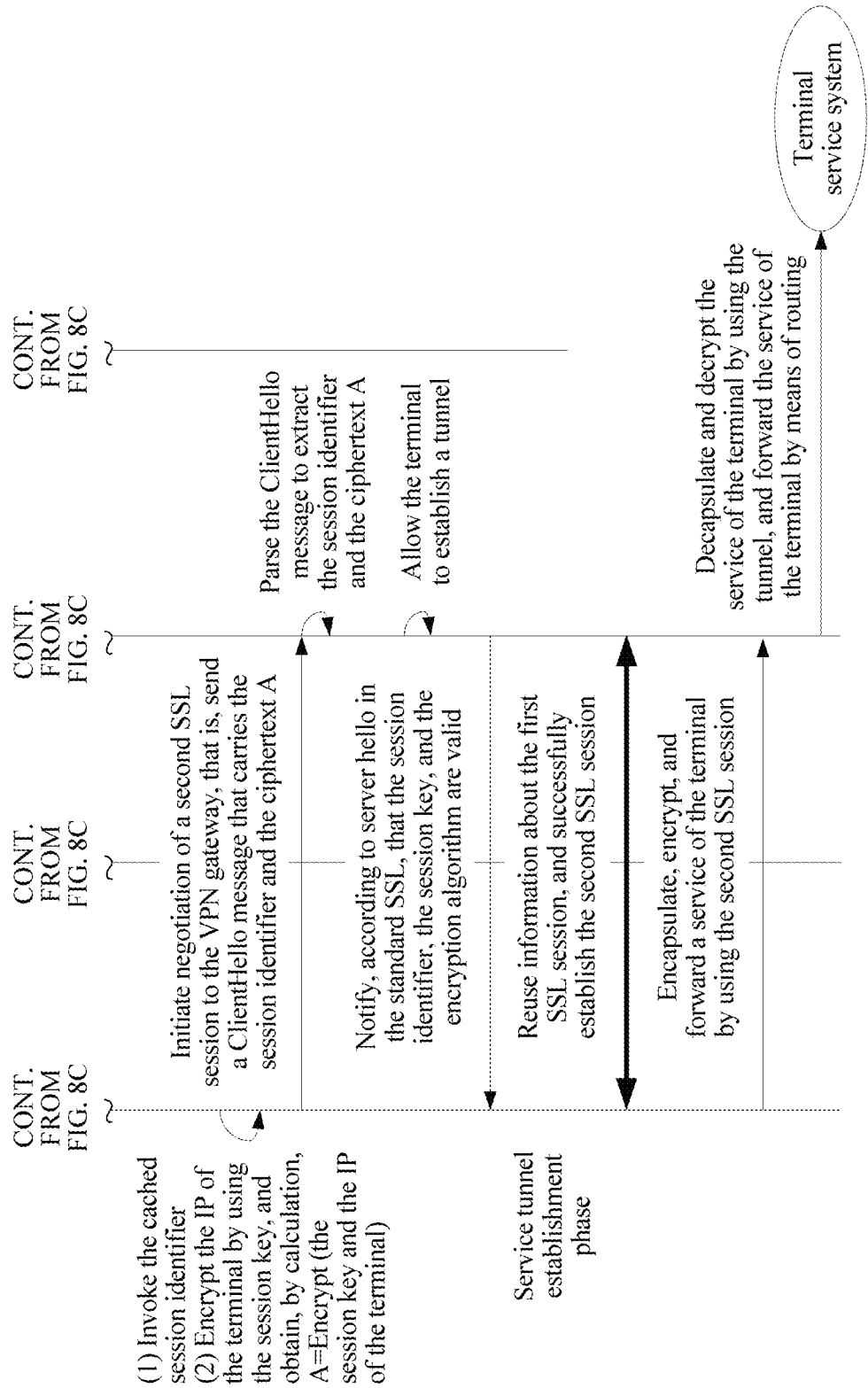

METHOD AND SYSTEM USED BY TERMINAL TO CONNECT TO VIRTUAL PRIVATE NETWORK, AND RELATED DEVICE

CROSS-REFERENCE TO RELATED APPLICATIONS

This application is a continuation of International Patent Application No. PCT/CN2017/080310 filed on Apr. 12, 2017, which claims priority to Chinese Patent Application No. 201610242556.0 filed on Apr. 18, 2016. The disclosures of the aforementioned applications are hereby incorporated by reference in their entireties.

TECHNICAL FIELD

This application relates to the field of communications technologies, and in particular, to a method and a system used by a terminal to connect to a virtual private network (VPN), and a related device.

BACKGROUND

Internet Protocol (IP) camera (IPC) terminals are widespread. To prevent a video stream transmitted by an IPC terminal to a network from being maliciously monitored, and to prevent control signaling transmitted by the network to the IPC terminal from being maliciously tampered with in a transmission process, a Secure Sockets Layer (SSL) VPN technology is applied to the IPC terminal such that the video stream and the control signaling are encrypted to be transmitted between the IPC terminal and the network.

The SSL VPN technology means that a remote user is connected to an SSL VPN server using a web browser. A data packet transmitted between the remote user and the SSL VPN server is encrypted using the SSL protocol or the Transport Layer Security (TLS) protocol (a successor of the SSL protocol). Both the SSL protocol and the TLS protocol are referred to as "SSL" or the "SSL protocol" below.

A security connection client is disposed in an IPC terminal in advance. An IP address of a VPN gateway is preconfigured in the IPC terminal. The security connection client initiates authentication. After the authentication succeeds, an SSL session is established between the IPC terminal and the VPN gateway. A data stream (for example, a video stream) and a signaling stream may be encrypted using the SSL session for transmission.

An outdoor IPC terminal is unattended, and therefore there is a terminal security problem. After the IPC terminal is maliciously operated, malicious data transmitted to the network is difficult to be found because of encryption protection by a VPN. Therefore to ensure a secure connection of the IPC to the network, a VPN gateway cannot be deployed around a core network, and the VPN gateway is usually deployed on a router gateway.

The VPN gateway is deployed on the router gateway in a bypass mode. The "bypass mode" means that the VPN gateway is directly connected to the router gateway using a network cable, and the VPN gateway and the router gateway form an independent subnet. The VPN gateway is responsible for access authentication and SSL session establishment of an IPC terminal in an area managed by the VPN gateway, and forwarding a data stream and a signaling stream to a video private network. The video private network is an upper-layer network that includes the router gateway, a video surveillance device, and the like. Different VPN gateways have different IP addresses, and different VPN gateways are responsible for managing different areas. The IPC terminal is not allowed to connect to the network and establish an SSL session without permission of the VPN gateway. The IPC terminal needs to cooperate with a VPN gateway that manages an area in which the IPC terminal is located for normal use. An IP address that is of a VPN gateway and that is configured for the IPC terminal can be only an IP address of a VPN gateway that manages an area in which the IPC terminal is located. There are usually thousands of IPC terminals, and different IP addresses of VPN gateways are configured for IPC terminals located in different management areas. Therefore, workload is heavy and an error is easy to occur during configuration of an IP address of a VPN gateway for an IPC terminal.

SUMMARY

This application provides a method and a system used by a terminal to connect to a VPN, and a related device in order to resolve a problem that workload is heavy and an error is easy to occur currently during configuration of an IP address of a VPN gateway for a terminal.

According to a first aspect, a method used by a terminal to connect to a VPN is provided, including receiving, by a VPN control device, a first handshake message sent by a router gateway, where the first handshake message is sent by the router gateway after the router gateway receives a second handshake message sent by a terminal, and the second handshake message is used to initiate a negotiation process of a first SSL session to the VPN control device, determining, by the VPN control device according to the first handshake message, a session parameter of the first SSL session by negotiating with the terminal, and attempting to authenticate the terminal using the first SSL session, determining, by the VPN control device, an IP address of a first VPN gateway to which the terminal is allowed to connect after the terminal is authenticated, and notifying, by the VPN control device, the terminal of the IP address of the first VPN gateway.

In this aspect, the VPN control device is responsible for authenticating access of the terminal, and determining a VPN gateway to which the terminal is allowed to connect. When an IP address of the VPN control device is configured for all terminals in a system, terminal security authentication can be implemented. Particularly, if there is a large quantity of terminals, workload of configuration for the terminals can be greatly reduced, thereby improving configuration efficiency.

In optional implementation, the first handshake message carries a direct route entry of the router gateway, and the direct route entry includes a subnet prefix of a VPN gateway that is located on the router gateway in a bypass mode, and determining, by the VPN control device, an IP address of a first VPN gateway includes obtaining, by the VPN control device from a list of configured IP addresses of all VPN gateways, an IP address of a VPN gateway that belongs to the subnet prefix, of the VPN gateway, included in the direct route entry, and determining the obtained IP address of the VPN gateway as the IP address of the first VPN gateway.

In this implementation, the VPN control device determines the VPN gateway to which the terminal is allowed to connect. This avoids binding of the terminal and the VPN control device, and improves flexibility of access of the terminal.

In optional implementation, the method further includes notifying, by the VPN control device, the first VPN gateway of an IP address of the terminal and the session parameter of the first SSL session, where the first VPN gateway stores the IP address of the terminal and the session parameter of the first SSL session, and the session parameter includes a session key, a session identifier, and an encryption algorithm.

In optional implementation, the method further includes sending, by the terminal, a third handshake message to the first VPN gateway, where the third handshake message is used to initiate a negotiation process of a second SSL session to the first VPN gateway, the third handshake message carries the session identifier and a ciphertext, and the ciphertext is generated by encrypting the IP address of the terminal using the session key and the encryption algorithm.

In this implementation, the session parameter of the first SSL session established between the terminal and the VPN control device is directly reused for the second SSL session established between the terminal and the VPN gateway.

In optional implementation, attempting, by the VPN control device, to authenticate the terminal using the first SSL session includes receiving, by the VPN control device using the first SSL session, an authentication message sent by the terminal, where the authentication message carries the session identifier and authentication data, and the authentication data is obtained by encrypting an identifier of the terminal using the encryption algorithm and the session key, parsing, by the VPN control device, the authentication message to obtain the session identifier and the authentication data that are carried in the authentication message, decrypting the authentication data using the session key and the encryption algorithm to obtain the identifier of the terminal after the VPN control device stores the session identifier, and sending the identifier of the terminal to an authentication server, and determining, by the VPN control device, that access of the terminal is authorized if receiving an authentication success message returned by the authentication server, where the authentication success message is returned by the authentication server after the authentication server determines that the identifier of the terminal exists, or determining, by the VPN control device, that access of the terminal is unauthorized if receiving an authentication failure message returned by the authentication server.

In optional implementation, the method further includes receiving, by the first VPN gateway, the third handshake message, and parsing the third handshake message to obtain the session identifier and the ciphertext, and establishing, by the first VPN gateway, the second SSL session with the terminal, and using the session parameter of the first SSL session as a session parameter of the second SSL session if the first VPN gateway locally stores the session identifier, and that a result obtained by decrypting the ciphertext using the locally stored session key and encryption algorithm is the IP address of the terminal.

According to a second aspect, a system used by a terminal to connect to a VPN is provided, including a terminal configured to send a second handshake message to a router gateway, where the second handshake message is used to initiate a negotiation process of a first SSL session to a VPN control device, the router gateway configured to send a first handshake message to the VPN control device after receiving the second handshake message sent by the terminal, and the VPN control device configured to receive the first handshake message sent by the router gateway, determine, according to the first handshake message, a session parameter of the first SSL session by negotiating with the terminal, and attempt to authenticate the terminal using the first SSL session, determine an IP address of a first VPN gateway to which the terminal is allowed to connect after the terminal is authenticated, and notify the terminal of the IP address of the first VPN gateway.

In optional implementation, the router gateway is further configured to add a direct route entry to the second handshake message to obtain the first handshake message, where the direct route entry includes a subnet prefix of a VPN gateway that is located on the router gateway in a bypass mode, and the VPN control device is further configured to obtain, from a list of configured IP addresses of all VPN gateways, an IP address of a VPN gateway that belongs to the subnet prefix, of the VPN gateway, included in the direct route entry, and determine the obtained IP address of the VPN gateway as the IP address of the first VPN gateway.

In optional implementation, the VPN control device is further configured to notify the first VPN gateway of an IP address of the terminal and the session parameter of the first SSL session, and the first VPN gateway is further configured to store the IP address of the terminal and the session parameter of the first SSL session, where the session parameter includes a session key, a session identifier, and an encryption algorithm.

In optional implementation, the terminal is further configured to send a third handshake message to the first VPN gateway, where the third handshake message is used to initiate a negotiation process of a second SSL session to the first VPN gateway, the third handshake message carries the session identifier and a ciphertext, and the ciphertext is generated by encrypting the IP address of the terminal using the session key and the encryption algorithm.

In optional implementation, the terminal is further configured to send an authentication message to the VPN control device using the first SSL session, where the authentication message carries the session identifier and authentication data, and the authentication data is obtained by encrypting an identifier of the terminal using the encryption algorithm and the session key, the VPN control device is further configured to receive, using the first SSL session, the authentication message sent by the terminal, parse the authentication message to obtain the session identifier and the authentication data that are carried in the authentication message, decrypt the authentication data using the session key and the encryption algorithm to obtain the identifier of the terminal after the VPN control device stores the session identifier, and send the identifier of the terminal to an authentication server, the authentication server is further configured to receive the identifier of the terminal sent by the VPN control device, and return an authentication success message to the VPN control device if the authentication server stores the identifier of the terminal, or return an authentication failure message to the VPN control device if the authentication server does not store the identifier of the terminal, and the VPN control device is further configured to determine that access of the terminal is authorized if receiving the authentication success message returned by the authentication server, or determine that access of the terminal is unauthorized if receiving the authentication failure message returned by the authentication server.

In optional implementation, the first VPN gateway is further configured to receive the third handshake message, and parse the third handshake message to obtain the session identifier and the ciphertext, and if the first VPN gateway stores the session identifier, and that a result obtained by decrypting the ciphertext using the locally stored session key and encryption algorithm is the IP address of the terminal, establish the second SSL session with the terminal, and use the session parameter of the first SSL session as a session parameter of the second SSL session.

According to a third aspect, a VPN control device is provided, including a receiving module configured to receive a first handshake message sent by a router gateway, where the first handshake message is sent by the router gateway after the router gateway receives a second handshake message sent by a terminal, and the second handshake message is used to initiate a negotiation process of a first SSL session to the VPN control device, an authentication module configured to determine, according to the first handshake message, a session parameter of the first SSL session by negotiating with the terminal, and attempt to authenticate the terminal using the first SSL session, a determining module configured to determine an IP address of a first VPN gateway to which the terminal is allowed to connect after the terminal is authenticated, and a notification module configured to notify the terminal of the IP address of the first VPN gateway.

In optional implementation, the first handshake message carries a direct route entry of the router gateway, and the direct route entry includes a subnet prefix of a VPN gateway that is located on the router gateway in a bypass mode, and the determining module is further configured to obtain, from a list of configured IP addresses of all VPN gateways, an IP address of a VPN gateway that belongs to the subnet prefix, of the VPN gateway, included in the direct route entry, and determine the obtained IP address of the VPN gateway as the IP address of the first VPN gateway.

In optional implementation, the notification module is further configured to notify the first VPN gateway of an IP address of the terminal and the session parameter of the first SSL session, where the first VPN gateway stores the IP address of the terminal and the session parameter of the first SSL session, and the session parameter includes a session key, a session identifier, and an encryption algorithm.

In optional implementation, the receiving module is further configured to receive, using the first SSL session, an authentication message sent by the terminal, where the authentication message carries the session key and authentication data, and the authentication data is obtained by encrypting an identifier of the terminal using the encryption algorithm and the session key, and the authentication module is further configured to parse the authentication message to obtain the session identifier and the authentication data that are carried in the authentication message, decrypt the authentication data using the session key and the encryption algorithm to obtain the identifier of the terminal, and send the identifier of the terminal to an authentication server after the authentication module locally stores the session identifier, and if receiving, using the receiving module, an authentication success message returned by the authentication server, determine that access of the terminal is authorized, where the authentication success message is returned by the authentication server after the authentication server determines that the identifier of the terminal exists, or if receiving, using the receiving module, an authentication failure message returned by the authentication server, determine that access of the terminal is unauthorized.

According to a fourth aspect, a VPN control device is provided, including a processor and a communications interface, where the processor is configured to receive, using the communications interface, a first handshake message sent by a router gateway, where the first handshake message is sent by the router gateway after the router gateway receives a second handshake message sent by a terminal, and the second handshake message is used to initiate a negotiation process of a first SSL session to the VPN control device, determine, according to the first handshake message, a session parameter of the first SSL session by negotiating with the terminal, and attempt to authenticate the terminal using the first SSL session, determine an IP address of a first VPN gateway to which the terminal is allowed to connect after the terminal is authenticated, and notify, using the communications interface, the terminal of the IP address of the first VPN gateway.

In optional implementation, the first handshake message carries a direct route entry of the router gateway, and the direct route entry includes a subnet prefix of a VPN gateway that is located on the router gateway in a bypass mode, and the processor is further configured to obtain, from a list of configured IP addresses of all VPN gateways, an IP address of a VPN gateway that belongs to the subnet prefix, of the VPN gateway, included in the direct route entry, and determine the obtained IP address of the VPN gateway as the IP address of the first VPN gateway.

In optional implementation, the processor is further configured to notify, using the communications interface, the first VPN gateway of an IP address of the terminal and the session parameter of the first SSL session, where the first VPN gateway stores the IP address of the terminal and the session parameter of the first SSL session, and the session parameter includes a session key, a session identifier, and an encryption algorithm.

According to a fifth aspect, a router gateway is provided, including a processor and a communications interface, where the processor is configured to receive, using the communications interface, a second handshake message sent by a terminal, where the second handshake message is used to initiate a negotiation process of a first SSL session to the VPN control device, generate a first handshake message according to the second handshake message, and send the first handshake message to the VPN control device using the communications interface.

According to a sixth aspect, a terminal is further provided, including a processor and a communications interface, where the processor is configured to send a second handshake message to a router gateway using the communications interface, where the second handshake message is used to initiate a negotiation process of a first SSL session to a VPN control device, and the router gateway sends a first handshake message to the VPN control device after receiving the second handshake message, determine, according to the second handshake message, a session parameter of the first SSL session by negotiating with the VPN control device, and request, using the first SSL session, the VPN control device to attempt to authenticate the terminal, and receive, using the communications interface, an IP address that is of a first VPN gateway to which the terminal is allowed to connect and that is notified by the VPN control device, where the IP address of the first VPN gateway is determined by the VPN control device after the terminal is authenticated.

BRIEF DESCRIPTION OF DRAWINGS

FIG. 8A, FIG. 8B, FIG. 8C, and FIG. 8D is a schematic diagram of a working time sequence of terminal access authentication and SSL session establishment according to an embodiment of the present disclosure;

DESCRIPTION OF EMBODIMENTS

Figure 1:
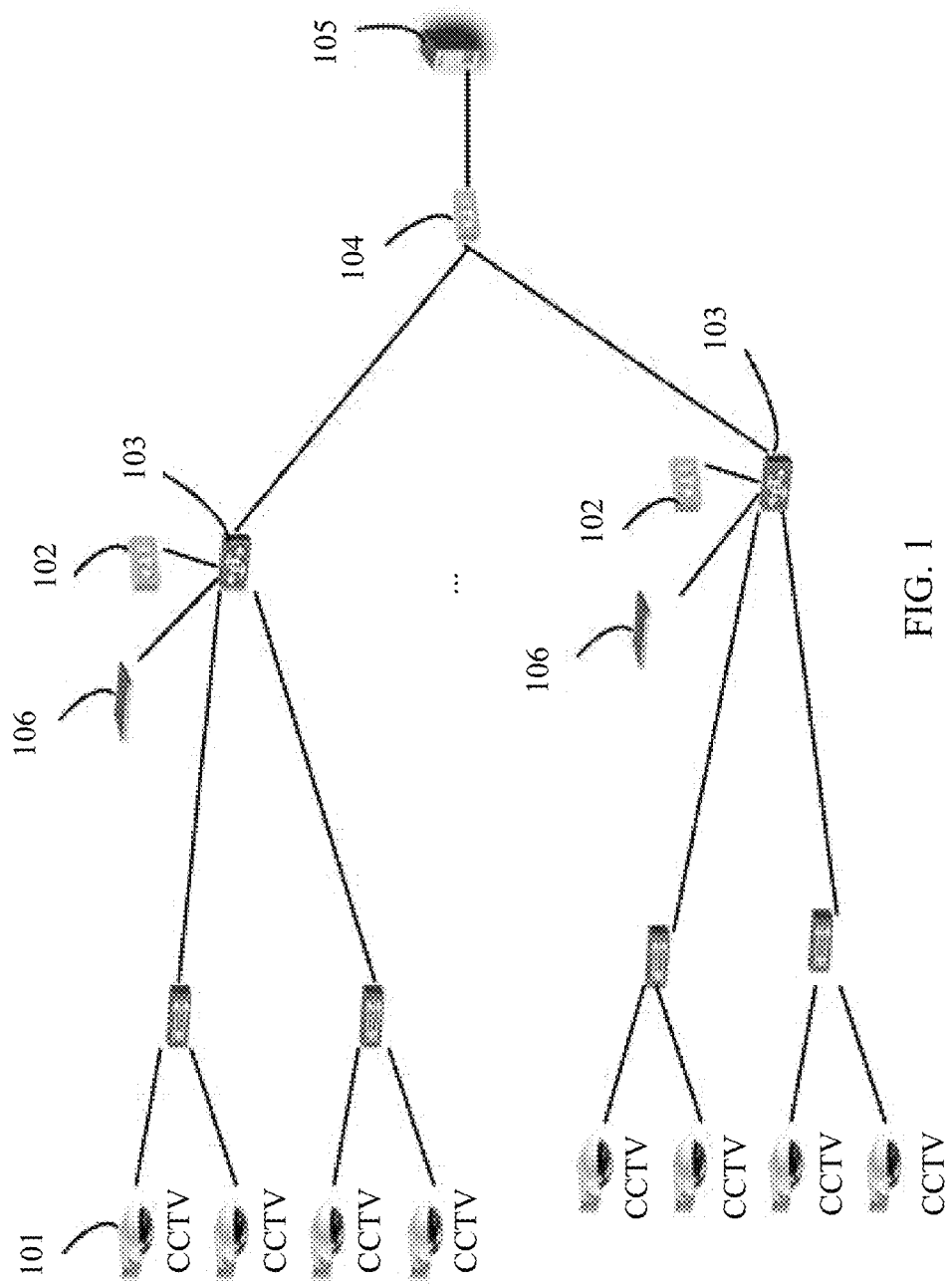
FIG. 1 is a schematic diagram of a system architecture in which a terminal is connected to a VPN according to an embodiment of the present disclosure.

In an embodiment of the present disclosure, FIG. 1 shows a system architecture in which a terminal is connected to a VPN. The system architecture mainly includes a terminal 101, a VPN gateway 102, a router gateway 103, a VPN control device 104, and an authentication server 105. Details are as follows.

The terminal 101 may be a terminal that supports an IP protocol stack, such as an IPC. Client software is installed on the terminal 101. The terminal initiates authentication. The terminal may be, for example, a mobile phone, a personal computer (such as a notebook computer or a desktop computer), a printer, an IP phone, closed-circuit television (CCTV), or a projector.

The VPN gateway 102 is configured to establish an SSL session with the terminal. The VPN gateway 102 performs tunnel encapsulation on a service stream and a signaling flow that are sent using the SSL session, decapsulates a service stream and a signaling flow that are received using the SSL session, and forwards the service stream to a next hop.

The router gateway 103 is disposed between a layer-2 network device and a layer-3 network device, and is configured to perform layer-2 access and layer-2 forwarding with the layer-2 network device. The layer-3 network device is connected to the VPN gateway and the VPN control device, and the router gateway 103 performs routing and forwarding with the layer-3 network device.

The VPN control device 104 is an authenticator of all terminals 101 in a system, and communicates with the authentication server 105 to complete authentication on the terminals. The VPN control device 104 sends an authentication result and an address of the VPN gateway to the terminal 101. The VPN control device 104 sends, to the VPN gateway 102, an identifier of a terminal 101 that is authenticated.

The authentication server 105 is configured to attempt to authenticate the terminal 101.

The VPN control device is a gateway device that works independently, or a function of the VPN control device is completed by multiple gateway devices by means of cooperation.

The VPN gateway is a gateway device that works independently, or a function of the VPN gateway is completed by multiple gateway devices by means of cooperation.

In an example in which the terminal 101 is an IPC terminal, the system may further include a video surveillance device 106. The video surveillance device 106 is configured to send signaling to the terminal 101 in an area managed by the VPN gateway 102. The video surveillance device 106 may display a video sent by the terminal 101. Optionally, the video surveillance device 106 may store a video sent by the terminal 101.

The VPN control device and the authentication server may be integrated into one device.

Figure 2:
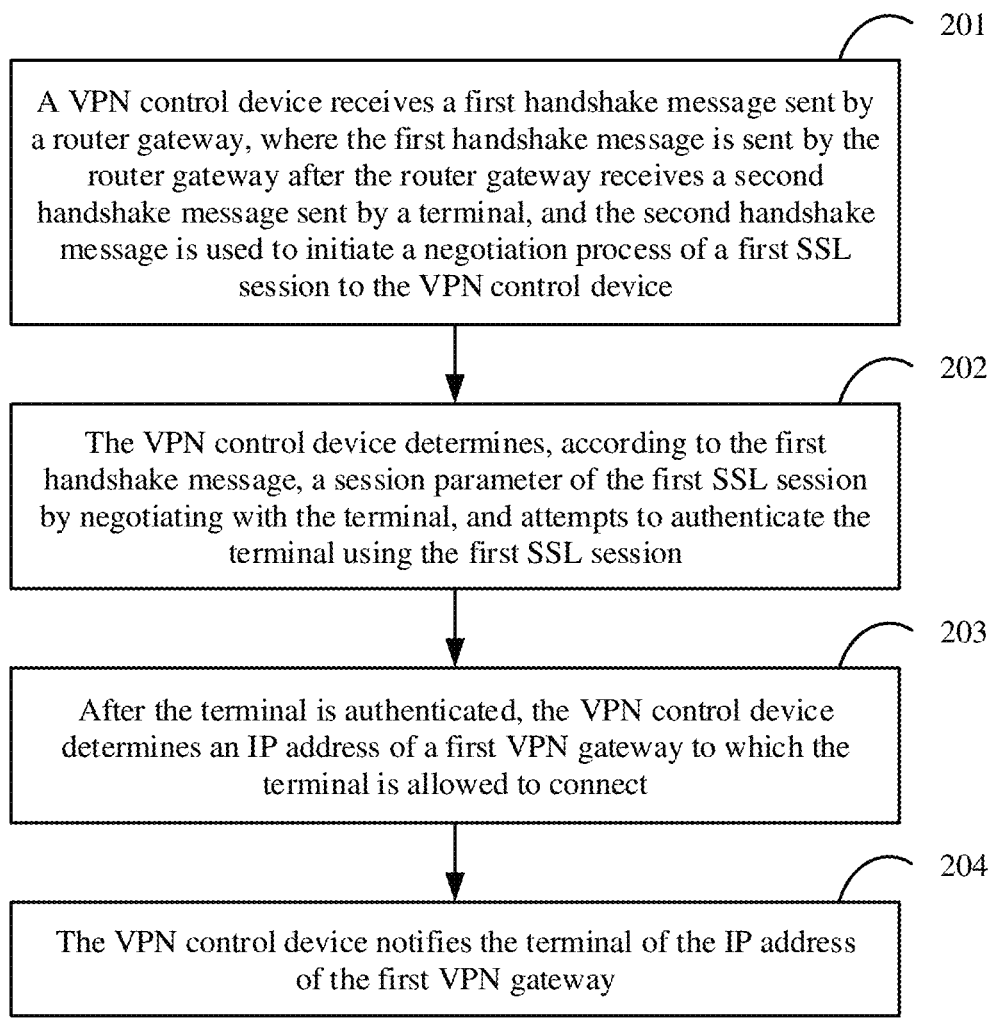
FIG. 2 is a schematic flowchart of a method used by a terminal to connect to a VPN according to an embodiment of the present disclosure.

Based on the foregoing system architecture, in an embodiment of the present disclosure, FIG. 2 shows a specific process in which a terminal is connected to a VPN. Details are as follows.

Step 201: A VPN control device receives a first handshake message sent by a router gateway, where the first handshake message is sent by the router gateway after the router gateway receives a second handshake message sent by a terminal, and the second handshake message is used to initiate a negotiation process of a first SSL session to the VPN control device.

Before the terminal sends the second handshake message, an IP address of the VPN control device needs to be configured for the terminal. IP addresses of all VPN gateways in a system are configured in the VPN control device. A direct route entry is configured in the router gateway. The direct route entry includes a subnet prefix of a VPN gateway that is located on the router gateway in a bypass mode, or the direct route entry includes a subnet prefix and a mask that are of a VPN gateway that is located on the router gateway in a bypass mode. The "bypass mode" means that the router gateway is connected to the VPN gateway using a network cable. The router gateway and the VPN gateway in a bypass mode belong to a same subnet.

The IP addresses of all the VPN gateways in the system, or masks and the IP addresses of all the VPN gateways in the system are configured in the VPN control device. The IP addresses that are of all the VPN gateways and that are configured in the VPN control device are different from each other, and subnet prefixes of all the VPN gateways are different from each other in order to ensure global uniqueness of the VPN gateways.

After receiving the second handshake message from the terminal, and before sending the first handshake message to the VPN control device, the router gateway adds the direct route entry of the router gateway to the second handshake message in order to obtain the first handshake message.

Step 202: The VPN control device determines, according to the first handshake message, a session parameter of the first SSL session by negotiating with the terminal, and attempts to authenticate the terminal using the first SSL session.

The session parameter of the first SSL session includes a session key, a session identifier, and an encryption algorithm, and the terminal and the VPN control device separately store the session parameter of the first SSL session.

The VPN control device receives, using the first SSL session, an authentication message sent by the terminal. The authentication message carries the session identifier and authentication data, and the authentication data is obtained by encrypting an identifier of the terminal using the encryption algorithm and the session key.

The VPN control device obtains the session identifier and the authentication data that are carried in the authentication message. After determining that the VPN control device stores the session identifier, the VPN control device decrypts the authentication data using the session key and the encryption algorithm, to obtain the identifier of the terminal, and sends the identifier of the terminal to an authentication server.

If receiving an authentication success message returned by the authentication server, the VPN control device determines that authentication on the terminal succeeds. If receiving an authentication failure message returned by the authentication server, the VPN control device determines that authentication on the terminal fails.

After determining that access of the terminal is unauthorized, the VPN control device tears down the first SSL session.

Step 203: After the terminal is authenticated, the VPN control device determines an IP address of a first VPN gateway to which the terminal is allowed to connect.

After the terminal is authenticated, the VPN control device determines, according to the direct route entry of the router gateway that sends the first handshake message, the first VPN gateway to which the terminal is allowed to connect.

Figure 3:
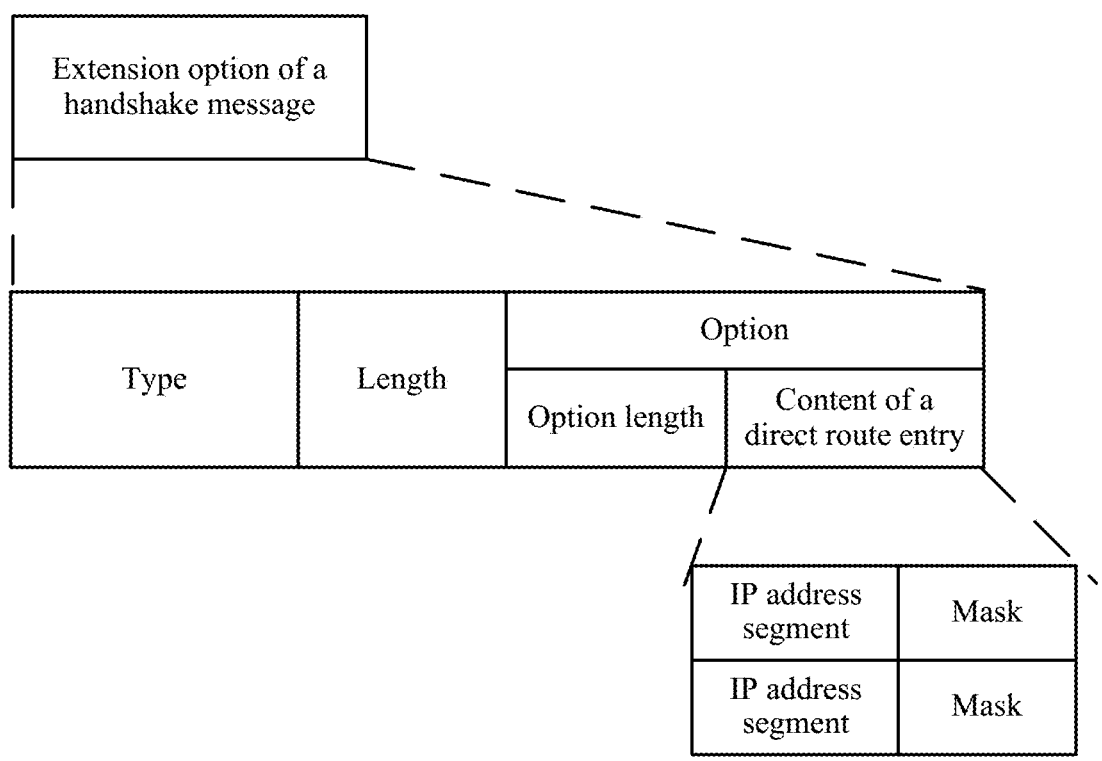
FIG. 3 is a schematic structural diagram of a direct route entry carried in an extension option of a ClientHello message according to an embodiment of the present disclosure.

For example, the terminal initiates the negotiation process of the first SSL session to the VPN control device according to the configured IP address of the VPN control device. That is, the terminal sends the second handshake message, that is, a ClientHello message using the IP address of the VPN control device as a destination address. The router gateway receives the ClientHello message sent by the terminal, and adds the direct route entry of the router gateway to an unoccupied extension option of the ClientHello message in order to obtain the first handshake message. FIG. 3 shows a structure of the extension option of the ClientHello message, and an option field corresponding to a type 60 carries the direct route entry of the router gateway. An extension type of the extension option of the ClientHello message may be any unused value in a range from 36 to 65280.

Figure 4:
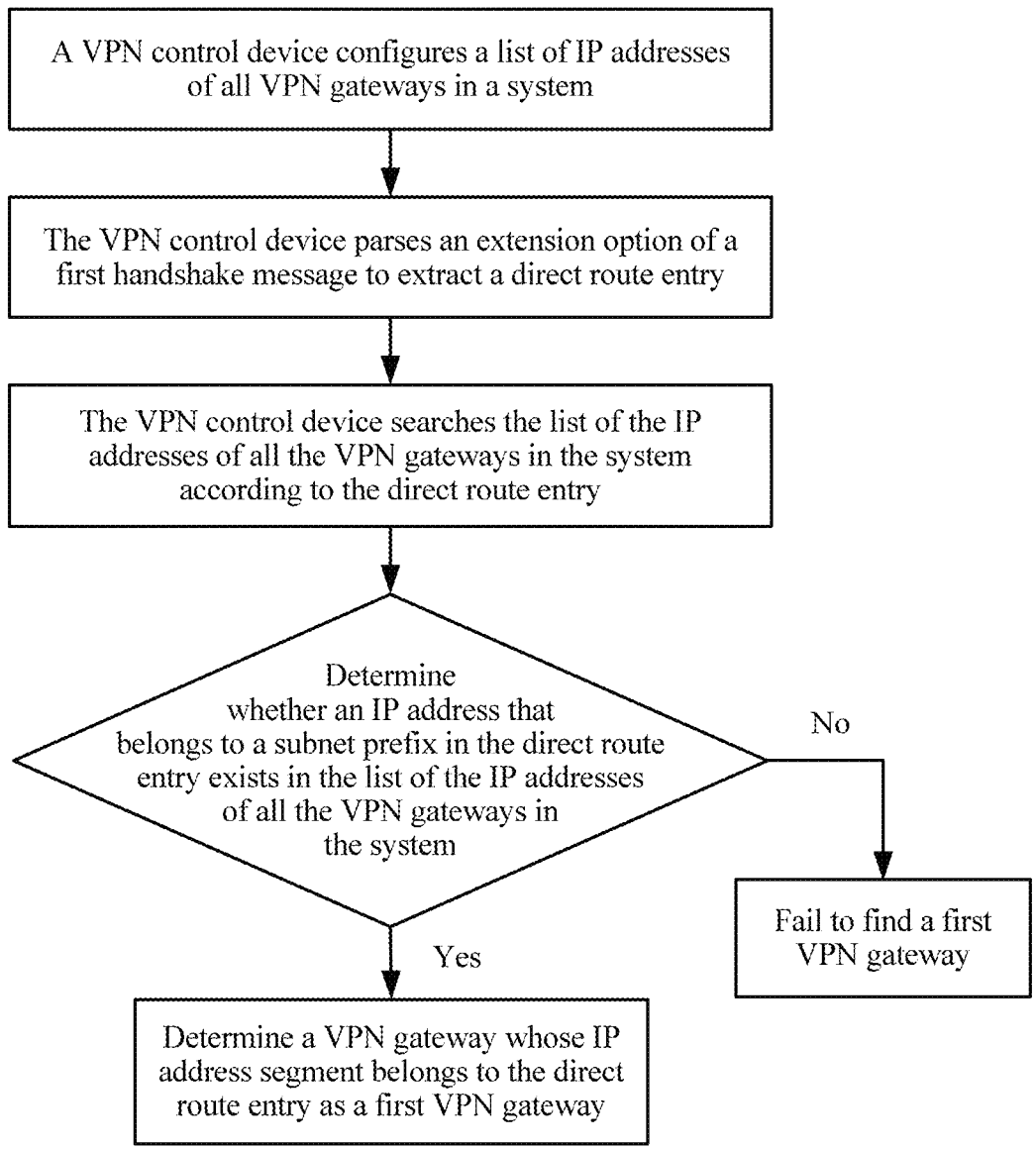
FIG. 4 is a schematic diagram of a process in which a VPN control device determines an IP address of a first VPN gateway according to an embodiment of the present disclosure.

FIG. 4 shows a process in which the VPN control device determines the IP address of the first VPN gateway. The VPN control device obtains, from a list of the configured IP addresses of all the VPN gateways in the system, an IP address of a VPN gateway that belongs to the subnet prefix, of the VPN gateway, included in the direct route entry carried in the first handshake message, and determines the obtained IP address of the VPN gateway as the IP address of the first VPN gateway. If more than one IP address of VPN gateways that belongs to the subnet prefix, of the VPN gateway, included in the direct route entry carried in the first handshake message is obtained, one IP address is randomly selected from the obtained eligible IP addresses as the IP address of the first VPN gateway.

Alternatively, the IP address of the first VPN gateway is determined in the following steps.

Step a: The VPN control device obtains a subnet prefix M and a mask N that are of a VPN gateway and that are in the direct route entry carried in the first handshake message, and performs an AND operation on the subnet prefix M and the mask N that are of the VPN gateway to obtain X.

Step b: For an IP address A that is of a VPN gateway and that is configured in the VPN control device and a mask B corresponding to the IP address A, perform an AND operation on the IP address A and the mask B to obtain Y.

Step c: Determine whether X is equal to Y, and if X is equal to Y, determine that the IP address A is the IP address of the first VPN gateway, or if X is not equal to Y, obtain an IP address that is of a next VPN gateway and that is configured in the VPN control device and a corresponding mask, and repeatedly perform step b and step c until the list of the IP addresses that are of all the VPN gateways in the system and that are configured in the VPN control device is traversed.

The VPN control device searches the list of the IP addresses of all the VPN gateways in the system according to the direct route entry. For example, if each entry in the direct route entry represents a subnet prefix of a VPN gateway, the subnet prefix of the VPN gateway is used to search the list of the IP addresses of all the VPN gateways in the system, and an IP address of a VPN gateway that belongs to the subnet prefix of the VPN gateway is determined as the IP address of the first VPN gateway to which the terminal needs to connect.

Step 204: The VPN control device notifies the terminal of the IP address of the first VPN gateway.

The VPN control device notifies the first VPN gateway of an IP address of the terminal and the session parameter of the first SSL session, and the first VPN gateway stores the IP address of the terminal and the session parameter of the first SSL session.

The terminal and the first VPN gateway reuse the session parameter of the first SSL session to establish a second SSL session. A process in which the terminal establishes the second SSL session with the first VPN gateway is as follows.

The terminal encrypts the IP address of the terminal using the session key and the encryption algorithm of the first SSL session, to generate a ciphertext, and adds the session identifier of the first SSL session and the ciphertext to a third handshake message, and sends the third handshake message to the first VPN gateway. The third handshake message is used to initiate a negotiation process of the second SSL session to the first VPN gateway.

Further, the third handshake message is a ClientHello message. A ciphertext A is generated by encrypting the IP address of the terminal using the session key and the encryption algorithm, and the ciphertext A is carried to an extension option of the ClientHello message. A type of the extension option of the ClientHello message may be any unused value in a range from 36 to 65280, and a type 61 represents that an option field of the extension option carries the ciphertext A.

The first VPN gateway receives the third handshake message, and obtains the session identifier and the ciphertext that are carried in the third handshake message. If determining that the first VPN gateway locally stores the session identifier, and that a result obtained by decrypting the ciphertext using the locally stored session key and encryption algorithm is the IP address of the terminal, the first VPN gateway establishes the second SSL session with the terminal, and uses the session parameter of the first SSL session as a session parameter of the second SSL session.

Figure 5:
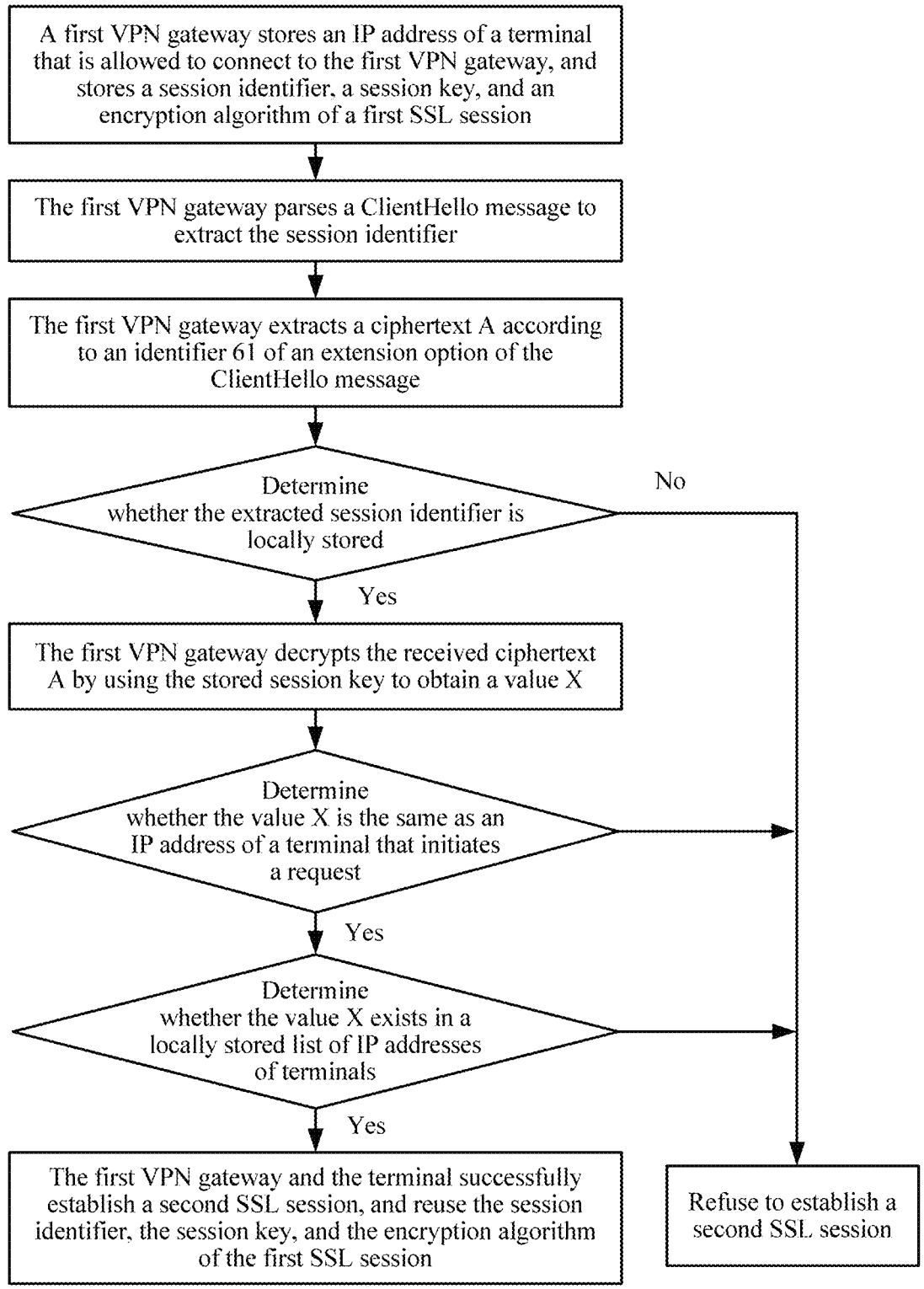
FIG. 5 is a schematic diagram of a process in which a first VPN gateway establishes an SSL session with a terminal according to an embodiment of the present disclosure.

FIG. 5 shows a process in which the first VPN gateway establishes the second SSL session with the terminal according to the session identifier and the ciphertext that is carried in the third handshake message. Details are as follows.

The first VPN gateway locally stores the IP address of the terminal that is allowed to connect to the first VPN gateway, and stores the session identifier, the session key, and the encryption algorithm of the first SSL session. The first VPN gateway parses the ClientHello message sent by the terminal to obtain the session identifier carried in the ClientHello message, and extracts the ciphertext A according to the extension option 61 of the ClientHello message. The first VPN gateway determines whether the session identifier carried in the ClientHello message is the same as the locally cached session identifier. If the session identifier carried in the ClientHello message is different from the locally cached session identifier, the first VPN gateway refuses to establish the second SSL session. If the session identifier carried in the ClientHello message is the same as the locally cached session identifier, the first VPN gateway decrypts the ciphertext A using the locally stored encryption algorithm and session key of the first SSL session in order to obtain a value X. The first VPN gateway determines whether the value X is the same as an IP address of a terminal that initiates a request. If the value X is different from the IP address of the terminal that initiates the request, the first VPN gateway refuses to establish the second SSL session. If the value X is the same as the IP address of the terminal that initiates the request, the first VPN gateway further determines whether the IP address of the terminal that initiates the request is the locally stored IP address of the terminal that is allowed to connect to the first VPN gateway. If the IP address of the terminal that initiates the request is not the locally stored IP address of the terminal that is allowed to connect to the first VPN gateway, the first VPN gateway refuses to establish the second SSL session, or if the IP address of the terminal that initiates the request is the locally stored IP address of the terminal that is allowed to connect to the first VPN gateway, the first VPN gateway successfully establishes the second SSL session with the terminal, and reuses the session identifier, the session key, and the encryption algorithm of the first SSL session.

The following uses a specific embodiment to describe in detail a process of attempting to authenticate terminal access and establishing an SSL session used for service stream transmission.

Figure 6:
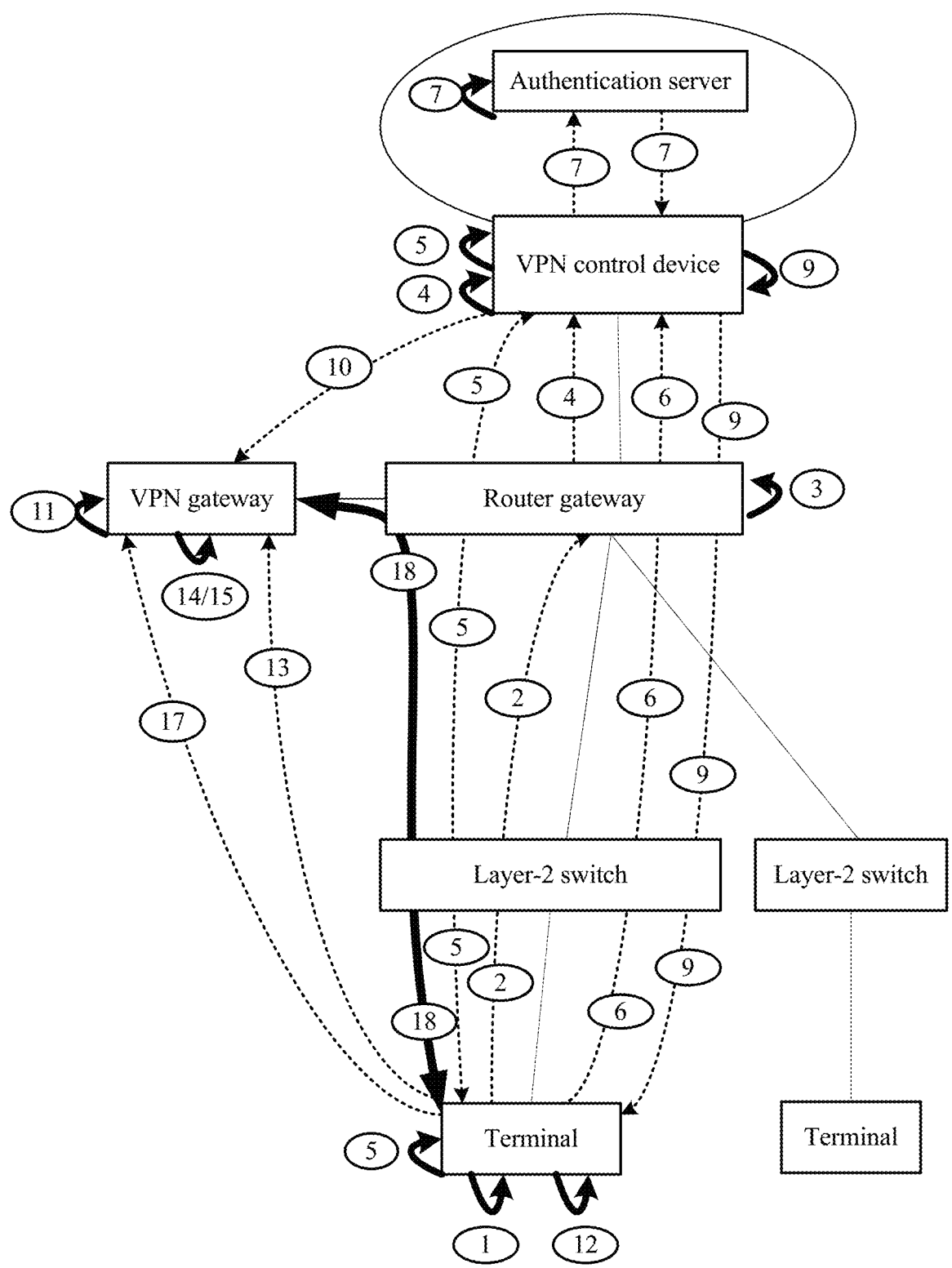
FIG. 6 is a schematic diagram of functional logic of terminal access authentication and SSL session establishment according to an embodiment of the present disclosure.
Figure 7A:
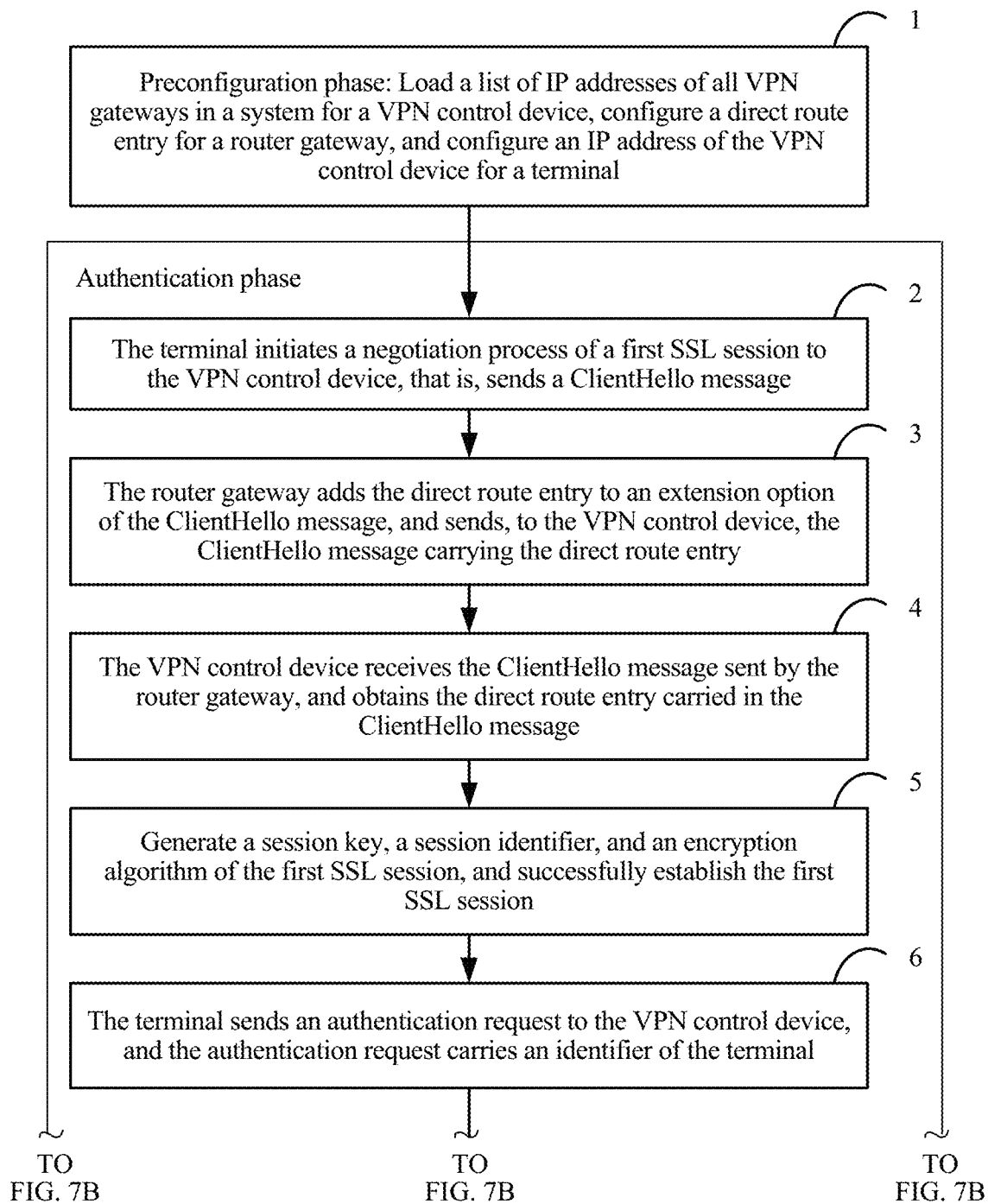
FIG. 7A, FIG. 7B, and FIG. 7C are a schematic flowchart of a method for terminal access authentication and SSL session establishment according to an embodiment of the present disclosure.
Figure 7B:
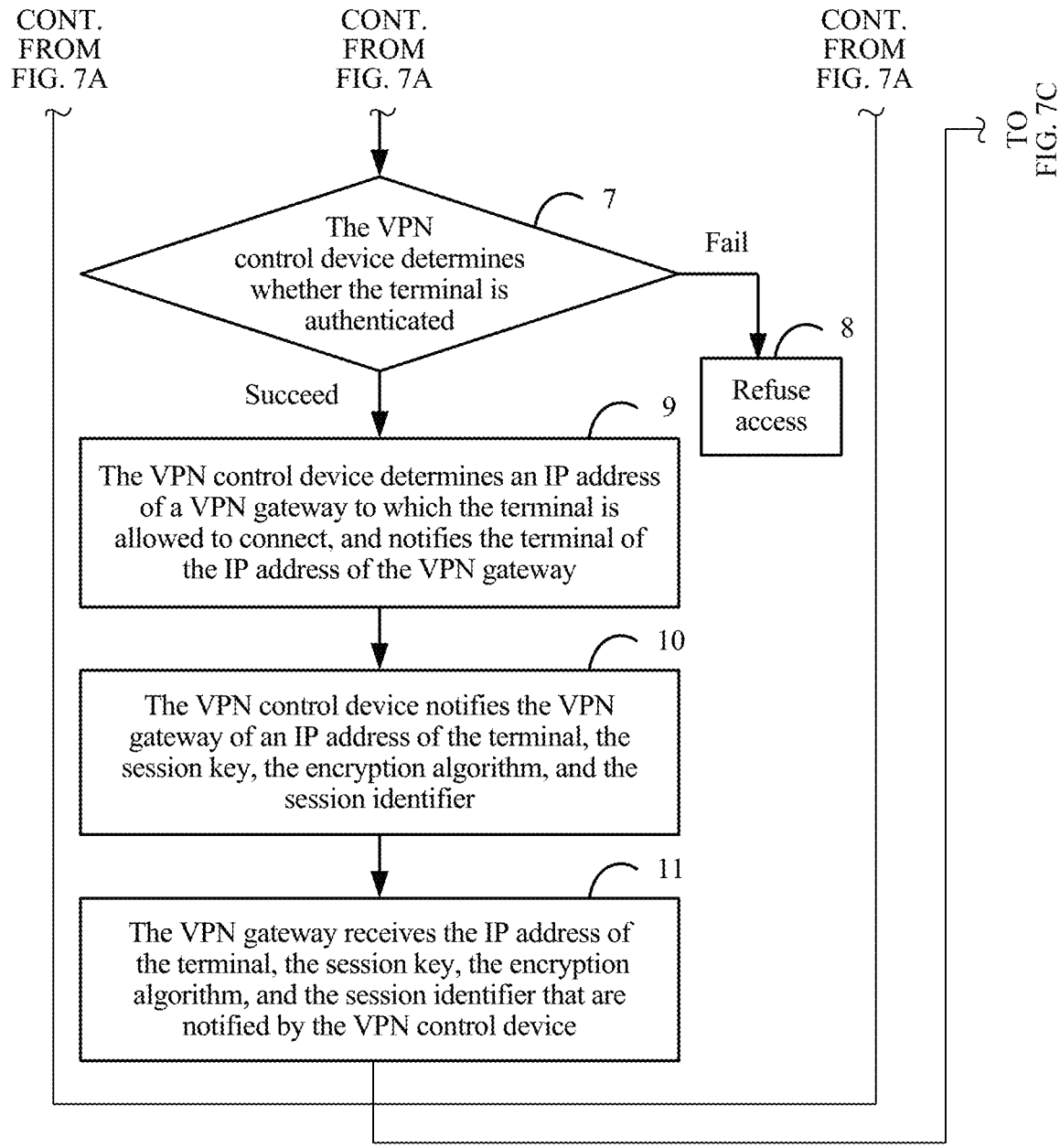
Figure 7C:
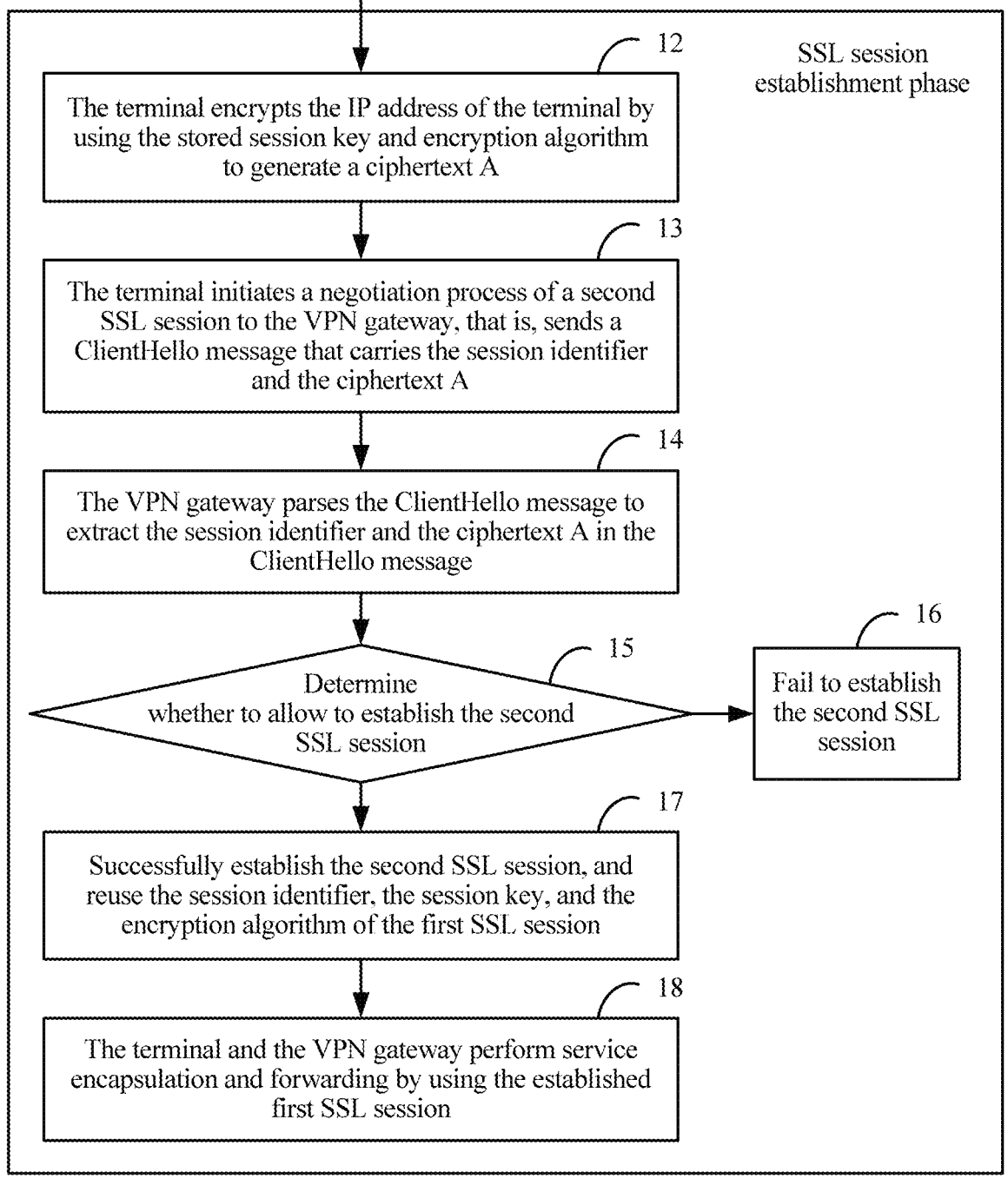
Figure 8A:
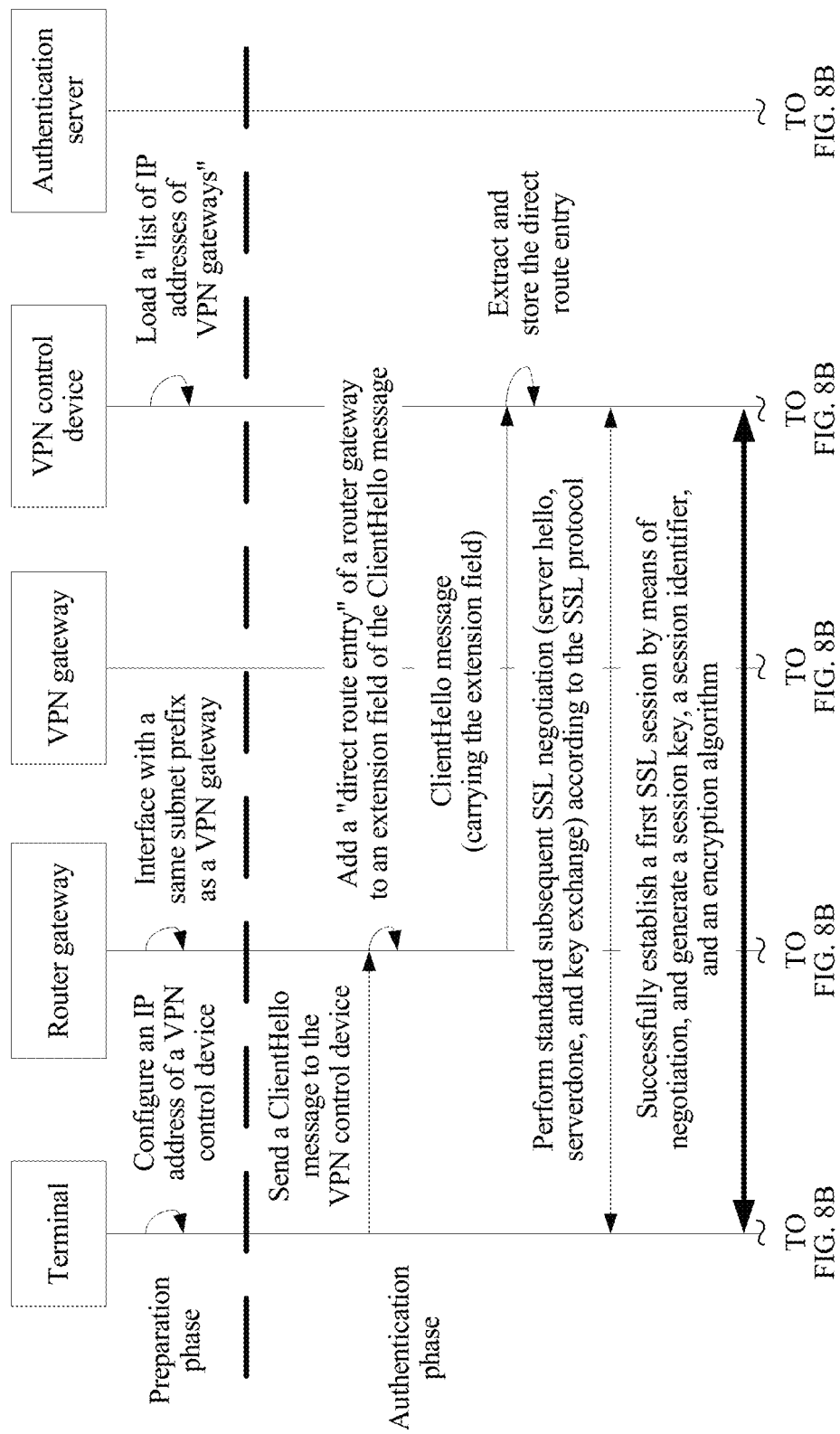
Figure 8B:
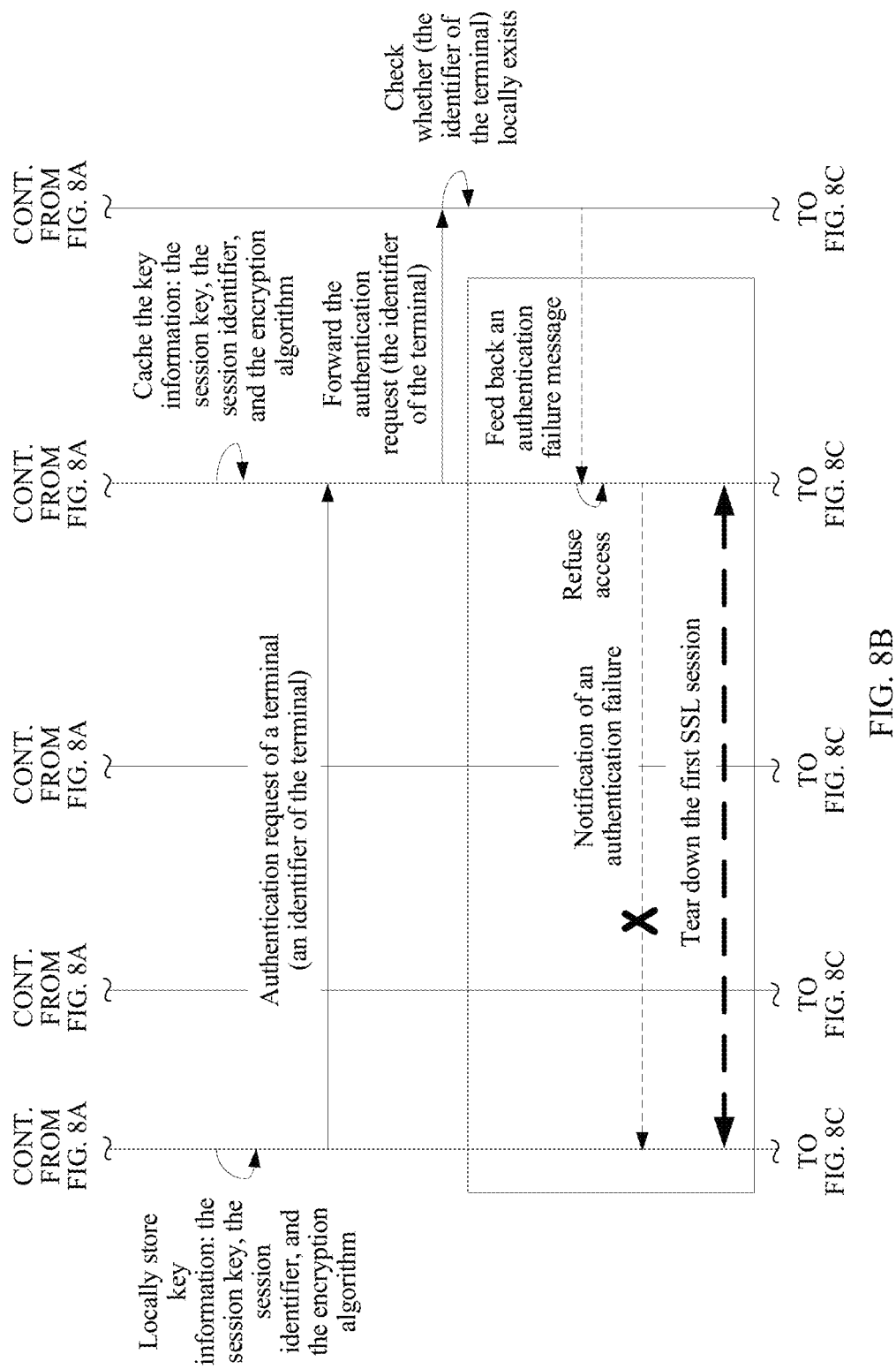
Figure 8C:
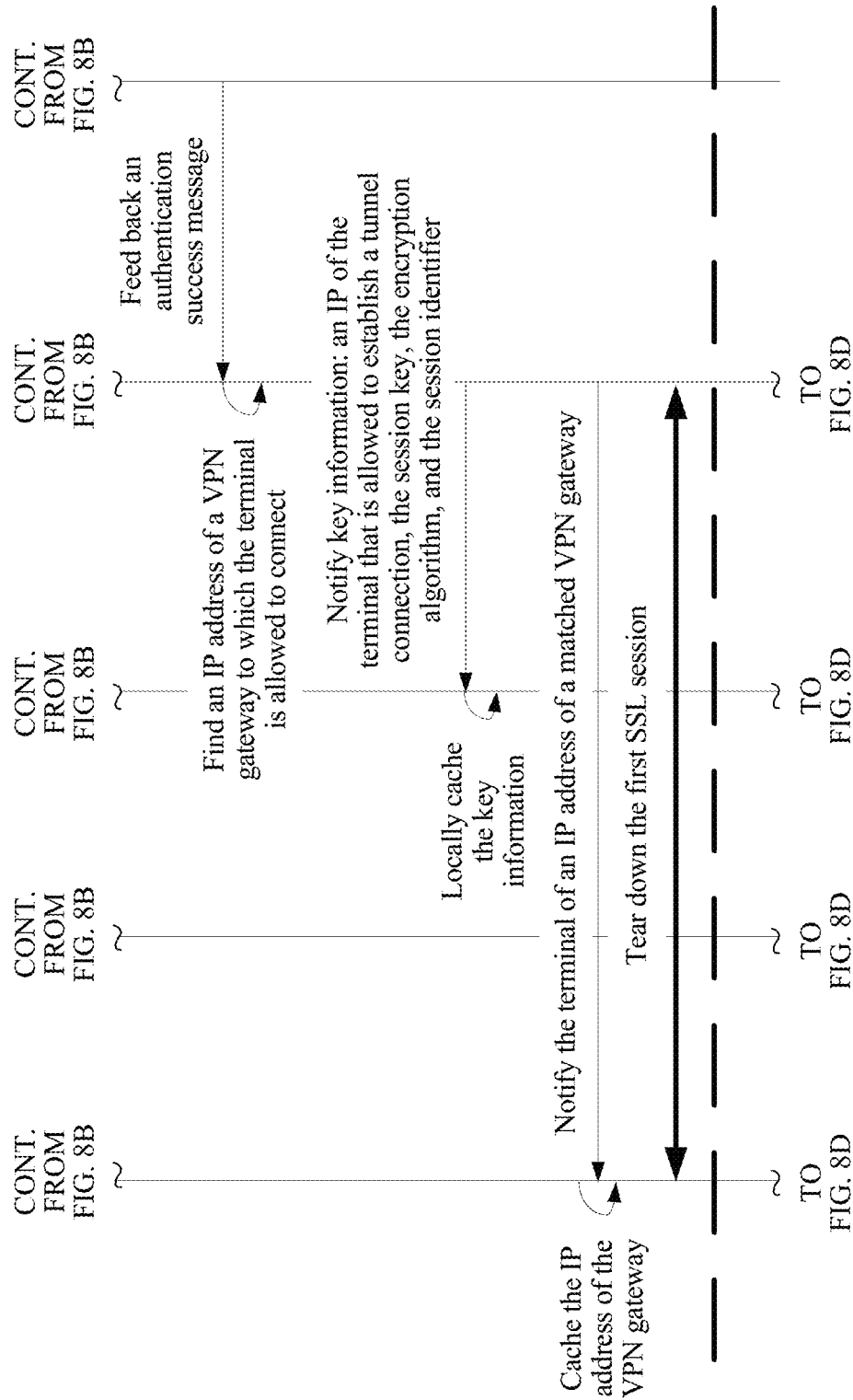

FIG. 6 is a schematic diagram of functional logic of terminal access authentication and SSL session establishment according to the specific embodiment. FIG. 7A, FIG. 7B, and FIG. 7C are a schematic flowchart of a method for terminal access authentication and SSL session establishment according to the specific embodiment. FIG. 8A, FIG. 8B, FIG. 8C, and FIG. 8D are a schematic diagram of a working time sequence of terminal access authentication and SSL session establishment according to the specific embodiment.

A specific process is as follows.

1. Preparation Phase.

Step 1: Configure three network elements, a VPN control device, a router gateway, and a terminal, and load a list of IP addresses of all VPN gateways in a system in the VPN control device, configure a direct route entry for the router gateway, and configure an IP address of the VPN control device for the terminal.

2. Authentication Phase.

Step 2: The terminal initiates a negotiation process of a first SSL session to the VPN control device according to the configured IP address of the VPN control device, and the terminal sends a ClientHello message using the IP address of the VPN control device as a destination address, and the ClientHello message is routed to the router gateway.

Step 3: The router gateway extracts the ClientHello message, adds the direct route entry to an extension option of the ClientHello message, and sends, to the VPN control device, the ClientHello message carrying the direct route entry.

Step 4: The VPN control device receives the ClientHello message sent by the router gateway, obtains the direct route entry carried in the ClientHello message, and locally stores the direct route entry.

Step 5: The VPN control device performs the subsequent negotiation process of the first SSL session with the terminal according to the standard SSL protocol, generates a session key, a session identifier, and an encryption algorithm of the first SSL session, and successfully establishes the first SSL session, and the terminal and the VPN control device separately store the session key, the session identifier, and the encryption algorithm, and all subsequent messages that are transmitted using the first SSL session are encrypted using the session key and the encryption algorithm, and carry the session identifier.

Step 6: The terminal sends an authentication request to the VPN control device, and the authentication request carries an identifier of the terminal.

Step 7: The VPN control device forwards the identifier of the terminal to an authentication server, and the authentication server checks whether the identifier of the terminal locally exists, and if the identifier of the terminal exists, the authentication server feeds back an authentication success message to the VPN control device, or if the identifier of the terminal does not exist, the authentication server feeds back an authentication failure message to the VPN control device, and if authentication fails, step 8 is performed, or if authentication succeeds, step 9 is performed.

Step 8: The VPN control device determines that the access authentication on the terminal fails, refuses access of the terminal, and tears down the first SSL session established between the VPN control device and the terminal.

Step 9: The VPN control device determines that the access authentication on the terminal succeeds, and the VPN control device determines an IP address of a first VPN gateway to which the terminal is allowed to connect, and notifies the terminal of the IP address of the first VPN gateway.

Step 10: The VPN control device notifies the first VPN gateway of the following content, an IP address of the terminal that is allowed to establish a second SSL session, and the session key, the encryption algorithm, and the session identifier of the first SSL session.

Step 11: The VPN gateway receives and stores the content notified by the VPN control device, the IP address of the terminal that is allowed to establish the second SSL session, and the session key, the encryption algorithm, and the session identifier of the first SSL session.

3. Phase of establishing an SSL session used for service stream forwarding

Step 12: The terminal encrypts the IP address of the terminal using the stored session key and encryption algorithm of the first SSL session to generate a ciphertext A that is denoted as A=Encrypt (the session key and the IP address of the terminal).

Step 13: The terminal initiates a negotiation process of the second SSL session to the VPN gateway, and the terminal sends a ClientHello message to the VPN gateway, the ClientHello message carries the session identifier of the first SSL session and the ciphertext A, and the ciphertext A is carried in an extension option of the ClientHello message.

Step 14: The VPN gateway parses the ClientHello message to extract the session identifier and the ciphertext A in the ClientHello message.

Step 15: The VPN gateway determines whether to allow the terminal to establish the second SSL session, and two determining conditions are as follows.

Condition 1: The VPN gateway determines whether the VPN gateway stores the session identifier carried in the ClientHello message, and if the VPN gateway stores the session identifier carried in the ClientHello message, a second determining condition is performed, or if the VPN gateway does not store the session identifier carried in the ClientHello message, the terminal is not allowed to establish the second SSL session, and step 16 is performed.

Condition 2: The VPN gateway decrypts the received ciphertext using the stored session key and encryption algorithm of the first SSL session, to obtain a value X, and determines whether the value X is the same as the IP address of the terminal, or whether the value X exists in a stored list of IP addresses of terminals, and if the value X is the same as the IP address of the terminal or the value X exists in the stored list of the IP addresses of the terminals, the terminal is allowed to establish the second SSL session, and step 17 is performed, or if the value X is different from the IP address of the terminal or the value X does not exist in the stored list of the IP addresses of the terminals, the terminal is not allowed to establish the second SSL session, and step 16 is performed.

Step 16: The terminal attempts to establish the second SSL session with the VPN gateway.

Step 17: The terminal and the VPN gateway successfully establish the second SSL session, and directly reuse the session identifier, the session key, and the encryption algorithm of the first SSL session established between the terminal and the VPN control device.

Step 18: The terminal and the VPN gateway perform service encapsulation and forwarding using the established second SSL session.

Figure 9:
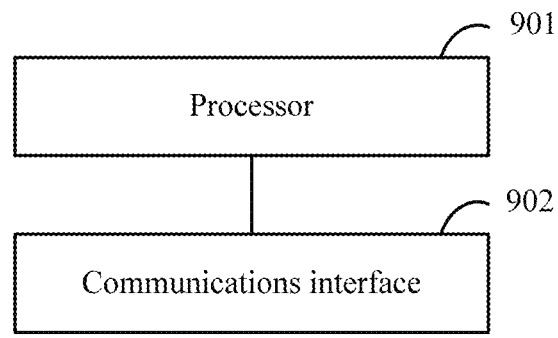
FIG. 9 is a schematic structural diagram of a VPN control device according to an embodiment of the present disclosure.

An embodiment of this application provides a VPN control device. For specific implementation of the VPN control device, refer to some description of the foregoing method embodiment. Repeated parts are not described again. As shown in FIG. 9, the VPN control device mainly includes a processor 901 and a communications interface 902. The processor 901 performs the following processes of receiving, using the communications interface 902, a first handshake message sent by a router gateway, where the first handshake message is sent by the router gateway after the router gateway receives a second handshake message sent by a terminal, and the second handshake message is used to initiate a negotiation process of a first SSL session to the VPN control device, determining, according to the first handshake message, a session parameter of the first SSL session by negotiating with the terminal, and attempting to authenticate the terminal using the first SSL session, determining an IP address of a first VPN gateway to which the terminal is allowed to connect after the terminal is authenticated, and notifying, using the communications interface 902, the terminal of the IP address of the first VPN gateway.

Figure 10:
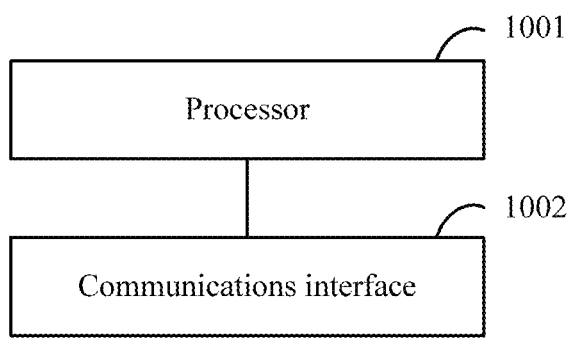
FIG. 10 is a schematic structural diagram of a router gateway according to an embodiment of the present disclosure.

An embodiment of this application further provides a router gateway. For specific implementation of the router gateway, refer to some description of the foregoing method embodiment. Repeated parts are not described again. As shown in FIG. 10, the router gateway includes a processor 1001 and a communications interface 1002. The processor 1001 performs the following processes according to the program of receiving, using the communications interface 1002, a second handshake message sent by a terminal, where the second handshake message is used to initiate a negotiation process of a first SSL session to the VPN control device, generating a first handshake message according to the second handshake message, and sending the first handshake message to the VPN control device using the communications interface 1002.

Figure 11:
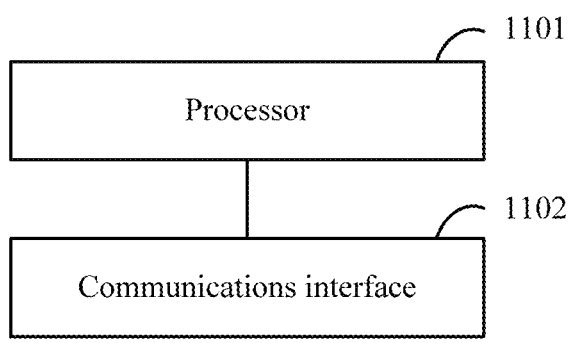
FIG. 11 is a schematic structural diagram of a terminal according to an embodiment of the present disclosure.

An embodiment of the present disclosure further provides a terminal. For specific implementation of the terminal, refer to some description of the foregoing method embodiment. Repeated parts are not described again. As shown in FIG. 11, the terminal includes a processor 1101 and a communications interface 1102. The processor 1101 performs the following processes of sending a second handshake message to a router gateway using the communications interface 1102, where the second handshake message is used to initiate a negotiation process of a first SSL session to a VPN control device, and the router gateway sends a first handshake message to the VPN control device after receiving the second handshake message, determining, according to the second handshake message, a session parameter of the first SSL session by negotiating with the VPN control device, and requesting, using the first SSL session, the VPN control device to attempt to authenticate the terminal, and receiving, using the communications interface 1102, an IP address that is of a first VPN gateway to which the terminal is allowed to connect and that is notified by the VPN control device, where the IP address of the first VPN gateway is determined by the VPN control device after the terminal is authenticated.

If the terminal is an IPC terminal, the terminal further includes a video collection module.

Figure 12:
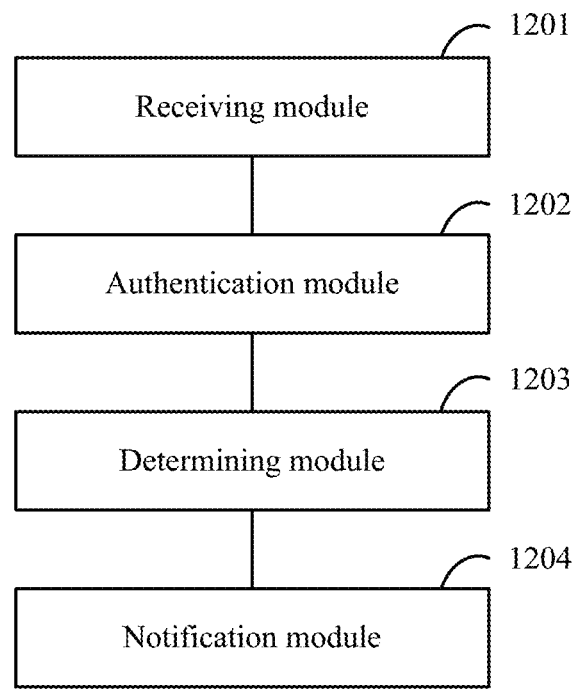
FIG. 12 is a schematic structural diagram of another VPN control device according to an embodiment of the present disclosure.

An embodiment of this application provides a VPN control device. For specific implementation of the VPN control device, refer to some description of the foregoing method embodiment. Repeated parts are not described again. As shown in FIG. 12, the VPN control device includes a receiving module 1201 configured to receive a first handshake message sent by a router gateway, where the first handshake message is sent by the router gateway after the router gateway receives a second handshake message sent by a terminal, and the second handshake message is used to initiate a negotiation process of a first SSL session to the VPN control device, an authentication module 1202 configured to determine, according to the first handshake message, a session parameter of the first SSL session by negotiating with the terminal, and attempt to authenticate the terminal using the first SSL session, a determining module 1203 configured to determine an IP address of a first VPN gateway to which the terminal is allowed to connect after the terminal is authenticated, and a notification module 1204 configured to notify the terminal of the IP address of the first VPN gateway.

Further, functions of the receiving module 1201 and the notification module 1204 may be implemented by the communications interface 902 of the VPN control device, and functions of the authentication module 1202 and the determining module 1203 may be implemented by the processor 901 of the VPN control device.

Figure 13:
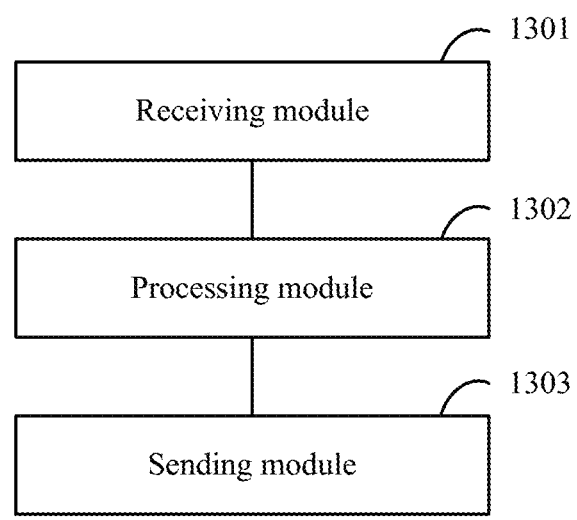
FIG. 13 is a schematic structural diagram of another router gateway according to an embodiment of the present disclosure.

An embodiment of this application provides a router gateway. For specific implementation of the router gateway, refer to some description of the foregoing method embodiment. Repeated parts are not described again. As shown in FIG. 13, the router gateway includes a receiving module 1301 configured to receive a second handshake message sent by a terminal, where the second handshake message is used to initiate a negotiation process of a first SSL session to the VPN control device, a processing module 1302 configured to generate a first handshake message according to the second handshake message, and a sending module 1303 configured to send the first handshake message to the VPN control device.

Further, functions of the receiving module 1301 and the sending module 1303 are implemented by the communications interface 1002 of the router gateway, and a function of the processing module 1302 is implemented by the processor 1001 of the router gateway.

Figure 14:
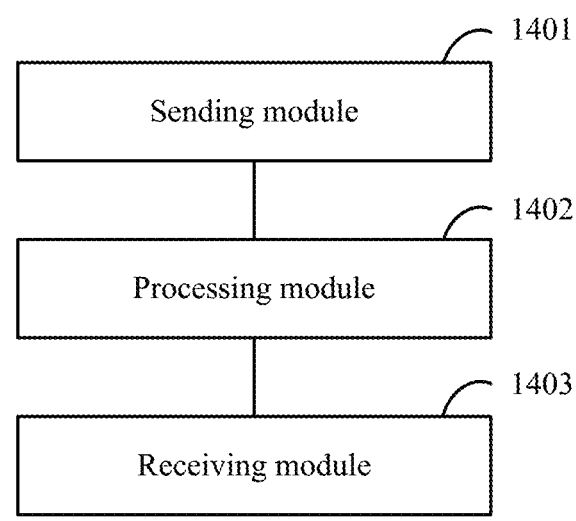
FIG. 14 is a schematic structural diagram of another terminal according to an embodiment of the present disclosure.

An embodiment of this application provides a terminal. For specific implementation of the terminal, refer to some description of the foregoing method embodiment. Repeated parts are not described again. As shown in FIG. 14, the terminal includes a sending module 1401 configured to send a second handshake message to a router gateway, where the second handshake message is used to initiate a negotiation process of a first SSL session to a VPN control device, and the router gateway sends a first handshake message to the VPN control device after receiving the second handshake message, a processing module 1402 configured to determine, according to the second handshake message, a session parameter of the first SSL session by negotiating with the VPN control device, and request, using the first SSL session, the VPN control device to attempt to authenticate the terminal, and a receiving module 1403 configured to receive an IP address that is of a first VPN gateway to which the terminal is allowed to connect and that is notified by the VPN control device, where the IP address of the first VPN gateway is determined by the VPN control device after the terminal is authenticated.

Further, functions of the sending module 1401 and the receiving module 1403 are implemented by the communications interface 1102 of the terminal, and a function of the processing module 1402 is implemented by the processor 1101 of the terminal.

A person skilled in the art should understand that the embodiments of the present disclosure may be provided as a method, a system, or a computer program product. Therefore, the present disclosure may use a form of hardware only embodiments, software only embodiments, or embodiments with a combination of software and hardware. Moreover, the present disclosure may use a form of a computer program product that is implemented on one or more computer-usable storage media (including but not limited to a disk memory, a compact disc read-only memory (CD-ROM), an optical memory, and the like) that include computer-usable program code.

The present disclosure is described with reference to the flowcharts and/or block diagrams of the method, the device (system), and the computer program product according to the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer or a processor of any other programmable data processing device to generate a machine such that the instructions executed by a computer or a processor of any other programmable data processing device generate an apparatus for implementing a specific function in one or more processes in the flowcharts and/or in one or more blocks in the block diagrams.

These computer program instructions may be loaded onto a computer or another programmable data processing device such that a series of operations and steps are performed on the computer or the other programmable device, thereby generating computer-implemented processing. Therefore, the instructions executed on the computer or the other programmable device provides steps for implementing a specific function in one or more processes in the flowcharts and/or in one or more blocks in the block diagrams.

A person skilled in the art can make various modifications and variations to the present disclosure without departing from the scope of the present disclosure. The present disclosure is intended to cover these modifications and variations provided that they fall within the scope of protection defined by the following claims.

What is claimed is:

1. A method used by a terminal to connect to a virtual private network (VPN), comprising:
    receiving, by a VPN control device, a first handshake message from a router gateway, the first handshake message being received from the router gateway after the router gateway receives a second handshake message from the terminal, and the second handshake message initiating a negotiation process of a first Secure Sockets Layer (SSL) session to the VPN control device, wherein the first handshake message carries a direct route entry of the router gateway, the direct route entry comprising a subnet prefix of a VPN gateway located on the router gateway in a bypass mode;
    determining, by the VPN control device according to the first handshake message, a session parameter of the first SSL session by negotiating with the terminal;
    attempting, by the VPN control device, to authenticate the terminal using the first SSL session;
    determining, by the VPN control device, an Internet Protocol (IP) address of a first VPN gateway to which the terminal is allowed to connect after the terminal is authenticated; and
    notifying, by the VPN control device, the terminal of the IP address of the first VPN gateway;
    wherein determining the IP address of the first VPN gateway comprises:
        obtaining, by the VPN control device from a list of configured IP addresses of all VPN gateways, an IP address of a VPN gateway belonging to the subnet prefix comprised in the direct route entry; and
        setting, by the VPN control device, the obtained IP address of the VPN gateway as the IP address of the first VPN gateway.

2. The method of claim 1, further comprising notifying, by the VPN control device, the first VPN gateway of an IP address of the terminal and the session parameter of the first SSL session, the first VPN gateway storing the IP address of the terminal and the session parameter of the first SSL session, and the session parameter comprising a session key, a session identifier, and an encryption algorithm.

3. The method of claim 2, further comprising sending, by the terminal, a third handshake message to the first VPN gateway, the third handshake message initiating a negotiation process of a second SSL session to the first VPN gateway, the third handshake message carrying the session identifier and a ciphertext, and the ciphertext being generated by encrypting the IP address of the terminal using the session key and the encryption algorithm.

4. The method of claim 2, wherein attempting to authenticate the terminal using the first SSL session comprises:
receiving, by the VPN control device using the first SSL session, an authentication message from the terminal, the authentication message carrying the session identifier and authentication data, and the authentication data being obtained by encrypting an identifier of the terminal using the encryption algorithm and the session key;
parsing, by the VPN control device, the authentication message to obtain the session identifier and the authentication data carried in the authentication message;
decrypting, by the VPN control device, the authentication data using the session key and the encryption algorithm to obtain the identifier of the terminal after the VPN control device stores the session identifier;
sending, by the VPN control device, the identifier of the terminal to an authentication server;
determining, by the VPN control device, that access of the terminal is authorized when receiving an authentication success message from the authentication server, the authentication success message being received from the authentication server after the authentication server determines that the identifier of the terminal exists; and
determining, by the VPN control device, that access of the terminal is unauthorized when receiving an authentication failure message from the authentication server.

5. The method of claim 1, wherein the router gateway and the VPN gateway belong to a same subnet in the bypass mode.

6. The method of claim 1, further comprising locally storing, by the VPN control device, the direct route entry.

7. A system used by a terminal to connect to a virtual private network (VPN), comprising:
a VPN control device comprising a first memory and a first processor coupled to the first memory; and
a router gateway connected to the VPN control device, the router gateway comprising a second memory and a second processor coupled to the second memory, wherein the second memory contains instructions that, when executed by the second processor, cause the router gateway to be configured to:
receive a second handshake message from the terminal, the second handshake message initiating a negotiation process of a first Secure Sockets Layer (SSL) session to the VPN control device;
send a first handshake message to the VPN control device after receiving the second handshake message from the terminal; and
add a direct route entry to the second handshake message to obtain the first handshake message, the direct route entry comprising a subnet prefix of a VPN gateway located on the router gateway in a bypass mode;
wherein the first memory contains instructions that, when executed by the first processor, cause the VPN control device to be configured to:
receive the first handshake message from the router gateway;
determine, according to the first handshake message, a session parameter of the first SSL session by negotiating with the terminal;
attempt to authenticate the terminal using the first SSL session;
set an Internet Protocol (IP) address of a first VPN gateway to which the terminal is allowed to connect after the terminal is authenticated by obtaining, from a list of configured IP addresses of all VPN gateways, an IP address of a VPN gateway belonging to the subnet prefix, and setting the obtained IP address of the VPN gateway as the IP address of the first VPN gateway; and
notify the terminal of the IP address of the first VPN gateway.

8. The system of claim 7, wherein the first memory contains instructions that, when executed by the first processor, cause the VPN control device to be further configured to notify the first VPN gateway of an IP address of the terminal and the session parameter of the first SSL session, the first VPN gateway being configured to store the IP address of the terminal and the session parameter of the first SSL session, and the session parameter comprising a session key, a session identifier, and an encryption algorithm.

9. The system of claim 8, wherein the terminal is further configured to send a third handshake message to the first VPN gateway, the third handshake message initiating a negotiation process of a second SSL session to the first VPN gateway, the third handshake message carrying the session identifier and a ciphertext, and the ciphertext being generated by encrypting the IP address of the terminal using the session key and the encryption algorithm.

10. The system of claim 8, wherein the terminal is further configured to send an authentication message to the VPN control device using the first SSL session, the authentication message carrying the session identifier and authentication data, the authentication data being obtained by encrypting an identifier of the terminal using the encryption algorithm and the session key, and the first memory contains instructions that, when executed by the first processor, cause the VPN control device to be further configured to:
receive, using the first SSL session, the authentication message from the terminal;
parse the authentication message to obtain the session identifier and the authentication data carried in the authentication message;
decrypt the authentication data using the session key and the encryption algorithm to obtain the identifier of the terminal after the VPN control device stores the session identifier; and
send the identifier of the terminal to an authentication server,
the authentication server being further configured to:
receive the identifier of the terminal from the VPN control device;
return an authentication success message to the VPN control device when the authentication server stores the identifier of the terminal; and
return an authentication failure message to the VPN control device when the authentication server does not store the identifier of the terminal, and
the VPN control device being further configured to:
determine that access of the terminal is authorized when receiving the authentication success message from the authentication server; and
determine that access of the terminal is unauthorized when receiving the authentication failure message from the authentication server.

11. The system of claim 7, wherein the router gateway and the VPN gateway belong to a same subnet in the bypass mode.

12. The system of claim 7, wherein the first memory is configured to locally store the direct route entry.

13. A virtual private network (VPN) control device, comprising:

a communications interface;
a memory configured to store instructions; and
a processor connected to the communications interface and to the memory, wherein the instructions, when executed by the processor, configure the processor to:
  receive, using the communications interface, a first handshake message from a router gateway, the first handshake message being received from the router gateway after the router gateway receives a second handshake message from a terminal, and the second handshake message initiating a negotiation process of a first Secure Sockets Layer (SSL) session to the VPN control device, wherein the first handshake message carries a direct route entry of the router gateway, the direct route entry comprising a subnet prefix of a VPN gateway located on the router gateway in a bypass mode;
  determine, according to the first handshake message, a session parameter of the first SSL session by negotiating with the terminal;
  attempt to authenticate the terminal using the first SSL session;
  set an Internet Protocol (IP) address of a first VPN gateway to which the terminal is allowed to connect after the terminal is authenticated by obtaining, from a list of configured IP addresses of all VPN gateways, an IP address of a VPN gateway belonging to the subnet prefix comprised in the direct route entry, and setting the obtained IP address of the VPN gateway as the IP address of the first VPN gateway; and
  notify, using the communications interface, the terminal of the IP address of the first VPN gateway.

14. The VPN control device of claim 13, wherein instructions, when executed by the processor, further configure the processor to notify using the communications interface, the first VPN gateway of an IP address of the terminal and the session parameter of the first SSL session, the first VPN gateway storing the IP address of the terminal and the session parameter of the first SSL session, and the session parameter comprising a session key, a session identifier, and an encryption algorithm.

15. The VPN control device of claim 14, wherein the instructions, when executed by the processor, further configure the processor to:
  receive, using the first SSL session, an authentication message from the terminal, the authentication message carrying the session identifier and authentication data, and the authentication data being obtained by encrypting an identifier of the terminal using the encryption algorithm and the session key;
  parse the authentication message to obtain the session identifier and the authentication data carried in the authentication message;
  decrypt the authentication data using the session key and the encryption algorithm to obtain the identifier of the terminal after the VPN control device stores the session identifier;
  send the identifier of the terminal to an authentication server;
  determine that access of the terminal is authorized when receiving an authentication success message from the authentication server, the authentication success message being received from the authentication server after the authentication server determines that the identifier of the terminal exists; and
  determine that access of the terminal is unauthorized when receiving an authentication failure message from the authentication server.

16. The VPN control device of claim 13, wherein the router gateway and the VPN gateway belong to a same subnet in the bypass mode.

17. The VPN control device of claim 13, wherein the memory is configured to locally store the direct route entry.

* * * * *